United States Patent
Sakaki et al.

(10) Patent No.: US 7,950,427 B2
(45) Date of Patent: May 31, 2011

(54) SHOCK ABSORBER LOADED IN INNER CAVITY OF TIRE ENCLOSED BY TIRE FOR TWO-WHEELER AND RIM

(75) Inventors: Toshiaki Sakaki, Kobe (JP); Yasuhisa Minagawa, Kobe (JP); Sadahiko Matsumura, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 1263 days.

(21) Appl. No.: 11/077,024

(22) Filed: Mar. 11, 2005

(65) Prior Publication Data
US 2005/0206112 A1 Sep. 22, 2005

(30) Foreign Application Priority Data
Mar. 22, 2004 (JP) ................... 2004-082658

(51) Int. Cl.
B60C 1/00 (2006.01)
B60C 7/10 (2006.01)
B60C 7/12 (2006.01)
C08J 9/04 (2006.01)

(52) U.S. Cl. ...................... 152/310; 428/36.5
(58) Field of Classification Search ........... 152/310–314
See application file for complete search history.

(56) References Cited

U.S. PATENT DOCUMENTS

| 3,169,945 A * | 2/1965 | Young et al. |
| 3,562,356 A * | 2/1971 | Nyberg et al. |
| 4,075,159 A * | 2/1978 | Koyama et al. |
| H1870 H * | 10/2000 | Mizata et al. |
| 2001/0042580 A1* | 11/2001 | Teratani |
| 2002/0120024 A1* | 8/2002 | Koffler et al. |

FOREIGN PATENT DOCUMENTS

| EP | 0 894 648 A2 | 2/1999 |
| GB | 1147119 A | 4/1969 |
| JP | 1-254411 A | 10/1989 |
| JP | 5-201213 A | 8/1993 |
| JP | 7-186610 A | 7/1995 |
| JP | 10-6707 A | 1/1998 |
| JP | 2001-18610 A | 1/2001 |
| JP | 2001-97003 A | 4/2001 |
| JP | 2001-97004 A | 4/2001 |
| JP | 2001-294012 A | 10/2001 |
| JP | 2002-67635 A | 3/2002 |

OTHER PUBLICATIONS

Modern Rubber Chemistry, Harry Barron, D. Van Nostrand Company Inc., New York, 1948, pp. 158-159.*
Rubber Technology and Manufacture, ed. C. M. Blow, Butterworth & Co. Ltd., London, 1975, p. 172.*

* cited by examiner

Primary Examiner — Adrienne C Johnstone
(74) Attorney, Agent, or Firm — Birch, Stewart, Kolasch & Birch, LLP

(57) ABSTRACT

The present invention provides a shock absorber loaded in the inner cavity of a tire enclosed by a tire for a two-wheeler and a rim, which exhibits suitable hardness when starting running and is excellent in cushioning property, both when starting running and during running, due to decrease in hardness as the temperature increases while running. Specifically, the present invention relates to a shock absorber which is loaded in the inner cavity of a tire enclosed by a tire for a two-wheeler and a rim and contacts substantially with the entire inner surface of a tire to be compressed, is circular in the tire circumferential direction and has closed cells; the shock absorber comprising an expanded rubber composition containing at least 5 parts by weight of an organic polymer having a softening point of at least 40° C., based on 100 parts by weight of a rubber component.

12 Claims, 1 Drawing Sheet

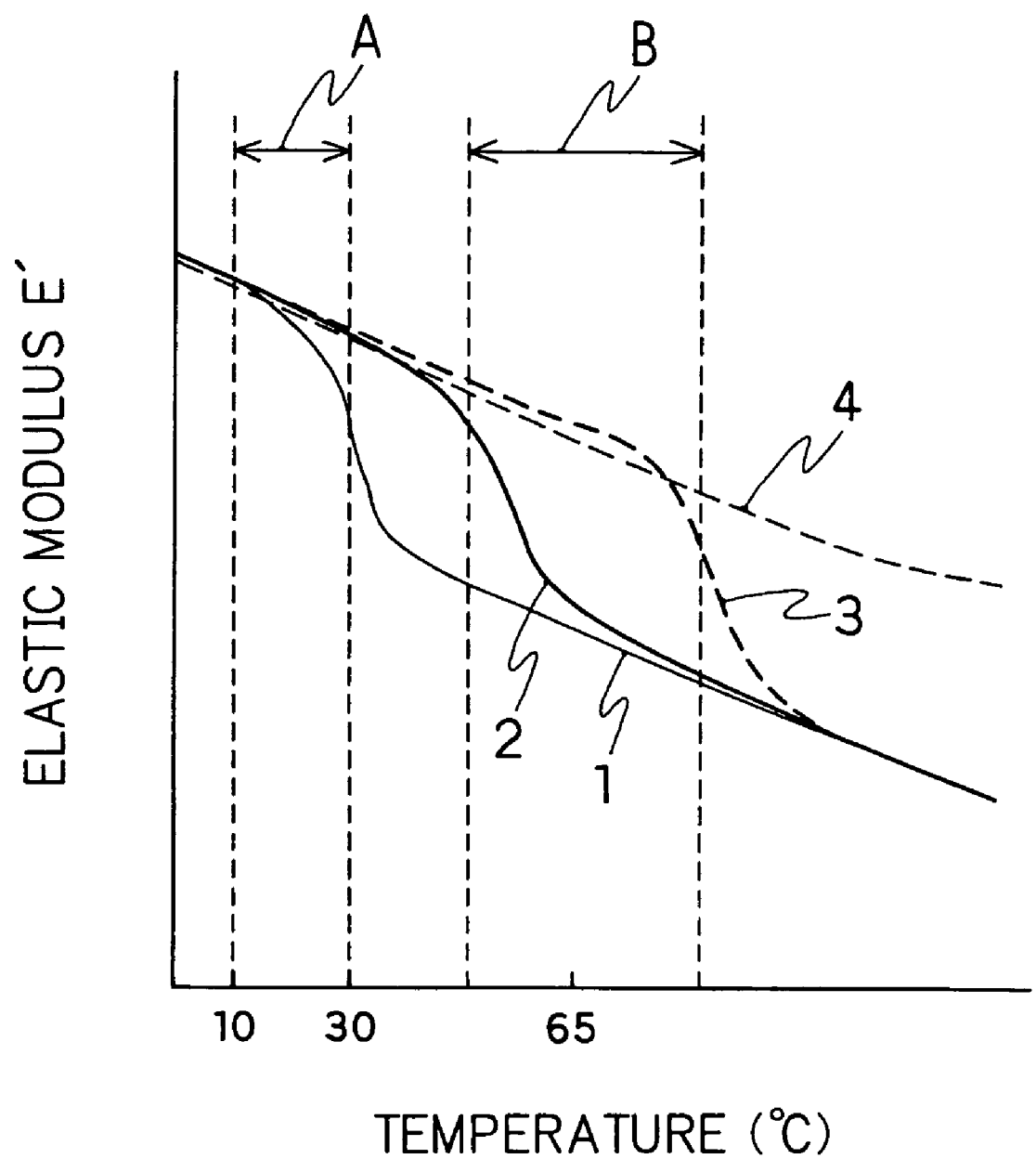

SHOCK ABSORBER LOADED IN INNER CAVITY OF TIRE ENCLOSED BY TIRE FOR TWO-WHEELER AND RIM

BACKGROUND OF THE INVENTION

The present invention relates to a shock absorber loaded in the inner cavity of a tire enclosed by a tire for a two-wheeler and a rim, particularly a shock absorber that gives excellent steering stability both when starting running and during running of a two-wheeler.

Tires of two-wheelers (such as motorcycles, bicycles) that run mainly on paved roads are filled with air on the inside of the tire in the same manner as four-wheelers and the air absorbs the shock from the road. For example, in the case of a tire having a tube, the tube is filled with air and in the case of a tubeless tire, air is filled directly into the inside of the tire.

In contrast, among two-wheelers that are designed to run on unpaved roads (off-roads), tires of those for intense running such as for jumping receive strong shock when landing and run on road surfaces having sharp bumps. Therefore, there is the problem that tires filled with air are punctured if used for such vehicles. In order to solve this problem, JP-A-7-186610 discloses the method of introducing a shock absorber having closed cells in the inner cavity of a tire enclosed by the tire and the rim instead of air to give cushioning property to the entire tire.

However, even when the shock absorber has sufficient cushioning property when starting running, the temperature of the shock absorber increases while repeating compression and recovery in the tire by running and the inner pressure of the cells in the shock absorber increases. In order to counteract this phenomenon, the shock absorber expands and when expansion of the shock absorber is ceased by the inner wall of the tire, the pressure increases. In this way, the elasticity of the shock absorber, which had sufficient cushioning property when starting running, increases and the tire can no longer absorb shock, thus causing steering stability to become poor. Even when the shock absorber is softened in order to prevent increase in elasticity of the shock absorber by running, the cushioning property when starting running becomes poor.

Thus, a shock absorber that exhibits sufficient hardness (storage modulus) both when starting running and during running of a two-wheeler is desired.

SUMMARY OF THE INVENTION

The present invention aims to provide a shock absorber loaded in the inner cavity of a tire enclosed by a tire for a two-wheeler and a rim, which exhibits suitable hardness when starting running of a two-wheeler and has excellent cushioning property both when starting running and during running due to decrease in hardness as the temperature increases while running.

That is, the present invention relates to a shock absorber which is loaded in the inner cavity of a tire enclosed by a tire for a two-wheeler and a rim and contacts substantially with the entire inner surface of a tire to be compressed, is circular in the tire circumferential direction and has closed cells; the shock absorber comprising an expanded rubber composition containing at least 5 parts by weight of an organic polymer having a softening point of at least 40° C., based on 100 parts by weight of a rubber component.

The shock absorber preferably comprises 5 to 40 parts by weight of the organic polymer based on 100 parts by weight of the rubber.

When the softening temperature of the shock absorber needs to be controlled, 0.1 to 10 parts by weight of a proton acid and/or a phenol derivative can be added.

The rubber of the shock absorber is preferably at least one member selected from the group consisting of butyl rubber, halogenated butyl rubber and a brominated copolymer of p-methylstyrene and isobutylene.

The organic polymer is preferably polycaprolactone.

The proton acid is preferably benzoic acid and/or a derivative thereof.

The ratio of the storage modulus of the shock absorber measured at a temperature of 20° C., a frequency of 10 Hz and strain of +0.25% to the storage modulus of the shock absorber measured at a temperature of 65° C., a frequency of 10 Hz and strain of +0.25% is preferably at least 2.5.

BRIEF DESCRIPTION OF THE DRAWINGS

FIG. 1 is a diagram showing the change in hardness to temperature of the shock absorber of the present invention.

DETAILED DESCRIPTION

The shock absorber of the present invention is loaded in the inner cavity of a tire enclosed by a tire for a two-wheeler and a rim. Examples of the two-wheeler are motorcycles and bicycles, particularly, those used on off-roads. The shock absorber of the present invention is preferably used for motorcycles. The shock absorber contacts with the entire inner surface of a tire to be compressed and is circular in the tire cirumferential direction.

The shock absorber has closed cells.

The expanding ratio of the shock absorber is preferably at least 200%, more preferably at least 300%. When the expanding ratio is less than 200%, the expanded article tends to become too hard. Also, the expanding ratio is preferably no more than 900%, more preferably no more than 700%. When the expanding ratio is more than 900%, stiffness tends to be insufficient.

The closed cells are preferably present in a ratio of 80 to 99.9% of the total cells in the shock absorber (closed cells and open cells). When less than 80% of closed cells are present, stiffness tends to be low.

The shock absorber comprises a rubber. To expand the rubber, a blowing agent such as an azodicarbonamide blowing agent is used. The blowing agent is added in the mixing step of the rubber compound and then the mixture is heated to obtain the expanded rubber.

Besides the above rubber composition, the shock absorber can also contain carbon black, oils, anitoxidants, wax, vulcanizing agents, vulanization accelerators, vulcanization aids, vulcanization activators and lubricants.

The rubber composition comprises a rubber component and an organic polymer having a softening point of at least 40° C.

As the rubber component, butyl rubber is preferably used for the reason that property of gas barrier is high. The butyl rubber is more preferably at least one selected from the group consisting of butyl rubber, halogenated butyl rubber and brominated copolymer of p-methylstyrene and isobutylene.

The rubber compound contains an organic polymer having a softening point of at least 40° C. The softening point is preferably at least 45° C., more preferably at least 50° C. When the softening point is lower than 40° C., hard rubber must be used in order to optimize the hardness at room temperature. As a result, when the temperature becomes high, the inner pressure rises and the rubber becomes hard. Also, the softening point is preferably no more than 90° C., more preferably no more than 80° C. When the softening point is higher than 90° C., the rubber tends not to become soft.

Specific examples of the organic polymer are polycaprolactone, terpene-phenol resin and coumarone resin. Of these, from the viewpoint of having a relatively sharp tan δ peak near 60° C. at which few other resins have a sharp peak, polycaprolactone is preferably used.

The hardness of the expanded material depends on the hardness of the matrix rubber, the expanding ratio, the open cell ratio, the size and shape of the cells and the inner pressure of the expanded material. For example, when the inner pressure is high, the expanded material is hard and when the inner pressure is low, the expanded material is soft. When the expanding ratio is high, the effect of the matrix rubber is small and when the expanding ratio is low, the effect of the matrix rubber is large. When the temperature of the tire increases while running, the hardness of the matrix rubber decreases, but the effect of increase in hardness due to increase in inner pressure is large and ultimately, as a result, the shock absorber becomes hard. The increase in hardness of the shock absorber of the present invention due to increase in temperature of the expanded material is suppressed by the organic polymer. FIG. 1 conceptually shows the change in hardness to temperature of the shock absorber of the present invention. Range A is the room temperature range and range B is the temperature range at which inner pressure increases. The shock absorber of the present invention is characterized in that the change in the hardness of range A and the hardness of range B is large. Shock absorber 4 does not contain the organic polymer. Shock absorber 1 has low hardness in range A and because the change in hardness at range B is small, increase in hardness cannot be suppressed. In shock absorber 3, the softening point of the organic polymer exceeds the usual temperature increase range of the shock absorber and therefore, the change in hardness in range A and range B is small. In shock absorber 2 of the present invention, the hardness of the shock absorber decreases in range B and therefore, increase in hardness due to increase in temperature of the expanded article can be suppressed.

The content of the organic polymer is at least 5 parts by weight, preferably at least 10 parts by weight, more preferably at least 15 parts by weight based on 100 parts by weight of the rubber component. When the content is less than 5 parts by weight, hardness (storage modulus) of the shock absorber is decreased by increase in temperature while running the tire and the effect of preventing steering stability from becoming poor is not exhibited. Also, the content is preferably no more than 40 parts by weight, more preferably no more than 35 parts by weight, further preferably no more than 30 parts by weight. When the content is more than 40 parts by weight, vulcanization molding tends to become difficult and favorable shock absorber may not be obtained.

When the temperature at which softening of the rubber composition begins is high, the rubber composition preferably contains a proton acid and/or a phenol derivative in order to control the softening point temperature. Examples of the proton acid are acetic acid, succinic acid, oleic acid, rhodinic acid, maleic acid, benzoic acid, p-methoxybenzoic acid, p-chlorobenzoic acid, p-nitrobenzoic acid, cinnamic acid, d-naphthylcarboxylic acid, phthalic acid, trimellitic acid, pyromellitic acid, phthalic anhydride and naphthoic acid. Examples of the phenol derivative are 4,4'-butylidenebis(3-methyl-6-tert-butylphenol), 4,4'-thiobis(3-methyl-6-tert-butylphenol), triethyleneglycol-bis[3-(3-tert-butyl-5-methyl-4-hydroxyphenyl)propionate] and 1,1'-bis(4-hydroxyphenyl)cyclohexane. The above compounds can be used alone or two or more kinds can be used together. Of these, for the reason that the beginning point of change in storage modulus can be particularly lowered when used together with polycaprolactone, benzoic acid and/or derivatives thereof are preferably used. Examples of derivatives of benzoic acid are p-methoxybenzoic acid, p-chlorobenzoic acid and p-nitrobenzoic acid.

The content of the proton acid and/or phenol derivative is preferably at least 0.1 part by weight based on 100 parts by weight of the rubber component and when the softening temperature does not need to be adjusted, the proton acid and/or phenol derivative does not need to be added. When the content is less than 0.1 part by weight, the starting point of change in storage modulus may not sufficiently be adjusted. Also, the content is preferably at most 10 parts by weight, more preferably at most 5 parts by weight. When the amount is more than 10 parts by weight, a long period of time is required for vulcanization or the rubber composition may not sufficiently be expanded.

Besides the rubber component, the organic polymer having a softening point of at least 40° C. and the proton acid and/or phenol derivative, reinforcing agents such as carbon black, softening agents such as mineral oil, zinc oxide, stearic acid, antioxidants, vulcanizing agents such as sulfur and vulcanization accelerators can be compounded to the rubber composition.

When carbon black is compounded to the rubber composition as a reinforcing agent, the amount thereof is preferably 10 to 100 parts by weight based on 100 parts by weight of the rubber component. When the amount is more than 10 parts by weight, the reinforcing effect may not be exhibited and when the amount is more than 100 parts by weight, the rubber composition tends to become too hard.

The storage modulus of the shock absorber comprising the rubber composition can be measured using the usual viscoelasticity measuring machine.

The storage modulus of the shock absorber measured at temperature of 20° C., frequency of 10 Hz and strain of +0.25% (E'1) is preferably 0.5 to 1.0 MPa. When the storage modulus is less than 0.5 MPa, the hardness of the shock absorber when starting running of a two-wheeler, to which tires having a shock absorber is attached, is too low that rim hitting occurs and as a result, steering stability tends to become poor. When the storage modulus is more than 1.0 MPa, hardness of the shock absorber when starting running is too high that steering stability tends to become poor.

The storage modulus of the shock absorber measured at temperature of 65° C., frequency of 10 Hz and strain of ±0.25% (E'2) is preferably 0.03 to 0.05 MPa. When the storage modulus is less than 0.03 MPa, the hardness of the shock absorber while running of a two-wheeler, to which tires having a shock absorber is attached, is too low that rim hitting occurs.

The ratio of the storage modulus of the shock absorber measured at temperature of 20° C., frequency of 10 Hz and strain of ±0.25% (E'1) to the storage modulus of the shock absorber measured at temperature of 65° C., frequency of 10 Hz and strain of ±0.25% (E'2) (E'1/E'2) is preferably at least 2.5, more preferably at least 3. When E'1/E'2 is less than 2.5, the decrease in storage modulus due to increase in temperature while running the two-wheeler is insufficient and steering stability tends to become poor. To observe the ratio of change in storage modulus due to temperature, a sheet can be prepared with a composition excluding the blowing agent and the tensile properties thereof can be evaluated.

Hereinafter, the present invention is explained in detail based on Examples but the present invention is not limited thereto.

The various chemicals used in Examples and Comparative Examples are described below.
Butyl rubber: 268 available from Exxon Chemical Japan Ltd.
Carbon black N330: DIABLACK H available from Mitsubishi Chemical Corporation
Mineral oil: PS-32 available from Idemitsu Kosan Co., Ltd.

Zinc oxide: Zinc oxide type 2 available from Mitsui Mining and Smelting Co., Ltd.
Stearic acid: TSUBAKI available from NOF Corporation
Antioxidant: NOCRAC 224 available from Ouchi Shinko Chemical Industrial Co., Ltd.
Polycaprolactone 1: PLACCEL H7 (number average molecular weight 70,000, softening point 60° C., glass transition temperature −60° C.) available from Daicel Chemical Industries, Ltd.
Polycaprolactone 2: PLACCEL HiP (number average molecular weight 10,000, softening point 60° C., glass transition temperature −60° C.) available from Daicel Chemical Industries, Ltd.
Terpene-phenol resin: YS Polyster T80 (softening point 180° C.) available from Yasuhara Chemical Co., Ltd.
Vulcanization accelerator 1: Nocceler-PZ (dithiocarbamate-type) available from Ouchi Shinko Chemical Industrial Co., Ltd.
Vulcanization accelerator 2: Nocceler-DM (thiazole-type) available from Ouchi Shinko Chemical Industrial Co., Ltd.
Blowing agent: VINYFOR DW#6 (azodicarbonamide-type) available from Eiwa Chemical Ind. Co., Ltd.

EXAMPLES 1 to 10 and COMPARATIVE EXAMPLES 1 to 3

Process for Preparing Shock Absorber

Of the compounding agents shown in Tables 1 and 2, the agents except for sulfur, the vulcanization accelerators 1 and 2 and the blowing agent were compounded and mixed. Sulfur, the vulcanization accelerators 1 and 2 and the blowing agent were mixed to the above compounds. The obtained compound was vulcanized at 160° C. in a molding die and then vulcanized at 160° C. in an oven to obtain a shock absorber (expanding ratio 570%).

(Test Methods)

<Measurement of Viscoelasticity>

The obtained shock absorber was cut out and used as the test sample. The viscoelasticity of the sample was measured under conditions of frequency of 10 Hz, sample thickness of 5 mm, amplitude of ±0.25% and temperature range of −55 to 120° C. using a viscoelasticity measuring machine (made by Rheology Co., Ltd.) and the storage modulus at 20° C. (E'1) and the storage modulus at 65° C. (E'2) were measured. Also, from the obtained results, the ratio (E'1/E'2) of the storage modulus at 20° C. (E'1) to the storage modulus at 65° C. (E'2) was calculated.

<Running Test>

A motorcross machine in which the shock absorbers were loaded between the front tire and the rim and the rear tire and the rim was run on a motorcross course and the steering stability 30 minutes after starting running was evaluated by sensory evaluation by the test rider, compared to the steering stability when running was started.

The results are shown in Tables 1 and 2.

TABLE 1

| | | Ex. | | | Com. Ex. |
|---|---|---|---|---|---|
| | 1 | 2 | 3 | 4 | 1 |
| Composition (parts by weight) | | | | | |
| Butyl rubber | 100 | 100 | 100 | 100 | 100 |
| Carbon black N330 | 60 | 60 | 60 | 60 | 60 |
| Mineral oil | 10 | 10 | 10 | 10 | 10 |
| Zinc oxide | 5 | 5 | 5 | 5 | 5 |
| Stearic acid | 1 | 1 | 1 | 1 | 1 |
| Antioxidant | 2 | 2 | 2 | 2 | 2 |
| Polycaprolactone 1 | 20 | 20 | 20 | 20 | — |
| Benzoic acid | 0.1 | 0.5 | 2 | 10 | — |
| Sulfur | 2 | 2 | 2 | 2 | 2 |
| Vulcanization accelerator 1 | 2 | 2 | 2 | 2 | 2 |
| Vulcanization accelerator 2 | 0.2 | 0.2 | 0.2 | 0.2 | 0.2 |
| Blowing agent | 13.3 | 13.3 | 13.3 | 13.3 | 13.3 |
| Total amount | 215.6 | 216 | 217.5 | 225.5 | 195.5 |
| Evaluation results | | | | | |
| E'1 (MPa) | 0.71 | 0.66 | 0.59 | 0.4 | 0.87 |
| E'2 (MPa) | 0.13 | 0.11 | 0.09 | 0.05 | 0.58 |
| E'1/E'2 | 5.46 | 6.00 | 6.56 | 8.00 | 1.51 |
| | ○ | ◎ | ○ | Δ | XX |
| Sensory evaluation (evaluation by actual driving with shock absorber installed) (comments after 30 min. from running start) | Becomes soft like tube tire after 10 to 15 min. from running start. Favorable steering stability. | Becomes soft like tube tire after 5 to 7 min. from running start. Favorable steering stability. | Becomes soft like tube tire after 3 to 5 min. from running start. Favorable steering stability. Gradually softens thereafter. | Gradually softens from start. After running for 30 min., softer than tube tire. Effective in low temperatures and for riders of low body weight. | Gradually hardens and starts to bounce while running. Extremely difficult to control. |

TABLE 2

|  | Ex. | | | | | | Com. Ex. | |
| --- | --- | --- | --- | --- | --- | --- | --- | --- |
|  | 5 | 6 | 7 | 8 | 9 | 10 | 2 | 3 |
| Composition (parts by weight) | | | | | | | | |
| Butyl rubber | 100 | 100 | 100 | 100 | 100 | 100 | 100 | 100 |
| Carbon black N330 | 60 | 60 | 60 | 60 | 60 | 60 | 60 | 60 |
| Mineral oil | 10 | 10 | 10 | 10 | 10 | 10 | 10 | 13 |
| Zinc oxide | 5 | 5 | 5 | 5 | 5 | 5 | 5 | 5 |
| Stearic acid | 1 | 1 | 1 | 1 | 1 | 1 | 1 | 1 |
| Antioxidant | 2 | 2 | 2 | 2 | 2 | 2 | 2 | 2 |
| Polycaprolactone 1 | 30 | — | 5 | 10 | 20 | 40 | — | — |
| Polycaprolactone 2 | — | 30 | — | — | — | — | — | — |
| Terpene-phenol resin | — | — | — | — | — | — | — | 30 |
| Sulfur | 2 | 2 | 2 | 2 | 2 | 2 | 2 | 2 |
| Vulcanization accelerator 1 | 2 | 2 | 2 | 2 | 2 | 2 | 2 | 2 |
| Vulcanization accelerator 2 | 0.2 | 0.2 | 0.2 | 0.2 | 0.2 | 0.2 | 0.2 | 0.2 |
| Blowing agent | 13.3 | 13.3 | 13.3 | 13.3 | 13.3 | 13.3 | 13.3 | — |
| Total amount | 225.5 | 225.5 | 200.5 | 205.5 | 215.5 | 235.5 | 195.5 | 215.2 |
| Evaluation results | | | | | | | | |
| $E'_1$ (MPa) | 0.70 | 0.75 | 0.8 | 0.76 | 0.72 | 0.75 | 0.87 | 0.8 |
| $E'_2$ (MPa) | 0.15 | 0.16 | 0.31 | 0.22 | 0.14 | 0.16 | 0.58 | 0.39 |
| $E'_1/E'_2$ | 4.74 ◎ | 4.69 ◎ | 2.58 △ | 3.45 ○ | 5.14 ◎ | 4.69 ◎ | 1.51 X | 2.05 X |
| Sensory evaluation (evaluation by actual driving with mousse installed) (comments 30 min. after starting running) | Can feel the tire softening while running. Can ride like a tube tire. Extremely favorable. | Can feel the tire softening while running. Can ride like a tube tire. Extremely favorable. | Softens a little while running. Bounces a little, but better steering stability than Com. Ex. 2 | Softer than and bounces less than Ex. 3. Some more softness is wanted. | Can feel the tire softening while running. Can ride like a tube tire. Extremely favorable. | Can feel the tire softening while running. Can ride like a tube tire. Extremely favorable. | Gradually hardens and starts to bounce while running. Extremely difficult to control. | Hardens while running. Not much better than Com. Ex. 2 |

According to the present invention, by mixing a rubber compound containing a specific amount of an organic polymer having a softening point of at most 40° C. in the shock absorber, the shock absorber exhibits suitable hardness when starting running and excellent cushioning property can be obtained, both when starting running and during running, due to decrease in hardness as the temperature increases while running.

What is claimed is:

1. A shock absorber for a two-wheeler which is loaded in the inner cavity of a tire enclosed by a tire for a two-wheeler and a rim, contacts substantially with the entire inner surface of a tire and is compressed at the same time, is circular in the tire circumferential direction and has closed cells;
said shock absorber for a two-wheeler comprising an expanded rubber containing at least 5 parts by weight of an organic polymer having a softening point of above 40° C., based on 100 parts by weight of a rubber and 0.1 to 10 parts by weight of a proton acid and/or a phenol derivative based on 100 parts by weight of said rubber.

2. The shock absorber for a two-wheeler of claim 1, which comprises 5 to 40 parts by weight of said organic polymer based on 100 parts by weight of said rubber.

3. The shock absorber for a two-wheeler of claim 1, wherein said rubber is at least one selected from the group consisting of butyl rubber, halogenated butyl rubber and a brominated copolymer of p-methylstyrene and isobutylene.

4. The shock absorber for a two-wheeler of claim 1, wherein said organic polymer is polycaprolactone.

5. The shock absorber for a two-wheeler of claim 1 wherein said proton acid is benzoic acid and/or a derivative thereof.

6. The shock absorber for a two-wheeler of claim 1, wherein the ratio of the storage modulus of the shock absorber measured at a temperature of 20° C., a frequency of 10 Hz and strain of ±0.25% to the storage modulus of the shock absorber measured at a temperature of 65° C., a frequency of 10 Hz and strain off 0.25% is at least 2.5.

7. A tire for a two-wheeler having a shock absorber which is loaded in the inner cavity of a tire enclosed by a tire for a two-wheeler and a rim, contacts substantially with the entire inner surface of a tire and is compressed at the same time, is circular in the tire circumferential direction and
has closed cells;
said shock absorber comprising an expanded rubber containing at least 5 parts by weight of an organic polymer having a softening point of above 40° C., based on 100 parts by weight of a rubber, and 0.1 to 10 parts by weight of a proton acid and/or a phenol derivative based on 100 parts by weight of said rubber.

8. The tire for a two-wheeler having the shock absorber of claim 7, which comprises 5 to 40 parts by weight of said organic polymer based on 100 parts by weight of said rubber.

9. The tire for a two-wheeler having the shock absorber of claim 7, wherein said organic polymer is polycaprolactone.

10. The tire for a two-wheeler having the shock absorber of claim 7, wherein said rubber is at least one selected from the group consisting of butyl rubber, halogenated butyl rubber and a brominated copolymer of p-methylstyrene and isobutylene.

11. The tire for a two-wheeler having the shock absorber of claim 10, wherein said proton acid is benzoic acid and/or a derivative thereof.

12. The tire for a two-wheeler having the shock absorber of claim 7, wherein the ratio of the storage modulus of the shock absorber measured at a temperature of 20° C., a frequency of 10 Hz and strain of ±0.25% to the storage modulus of the shock absorber measured at a temperature of 65° C., a frequency of 10 Hz and strain off 0.25% is at least 2.5.

* * * * *